Patented Nov. 1, 1932

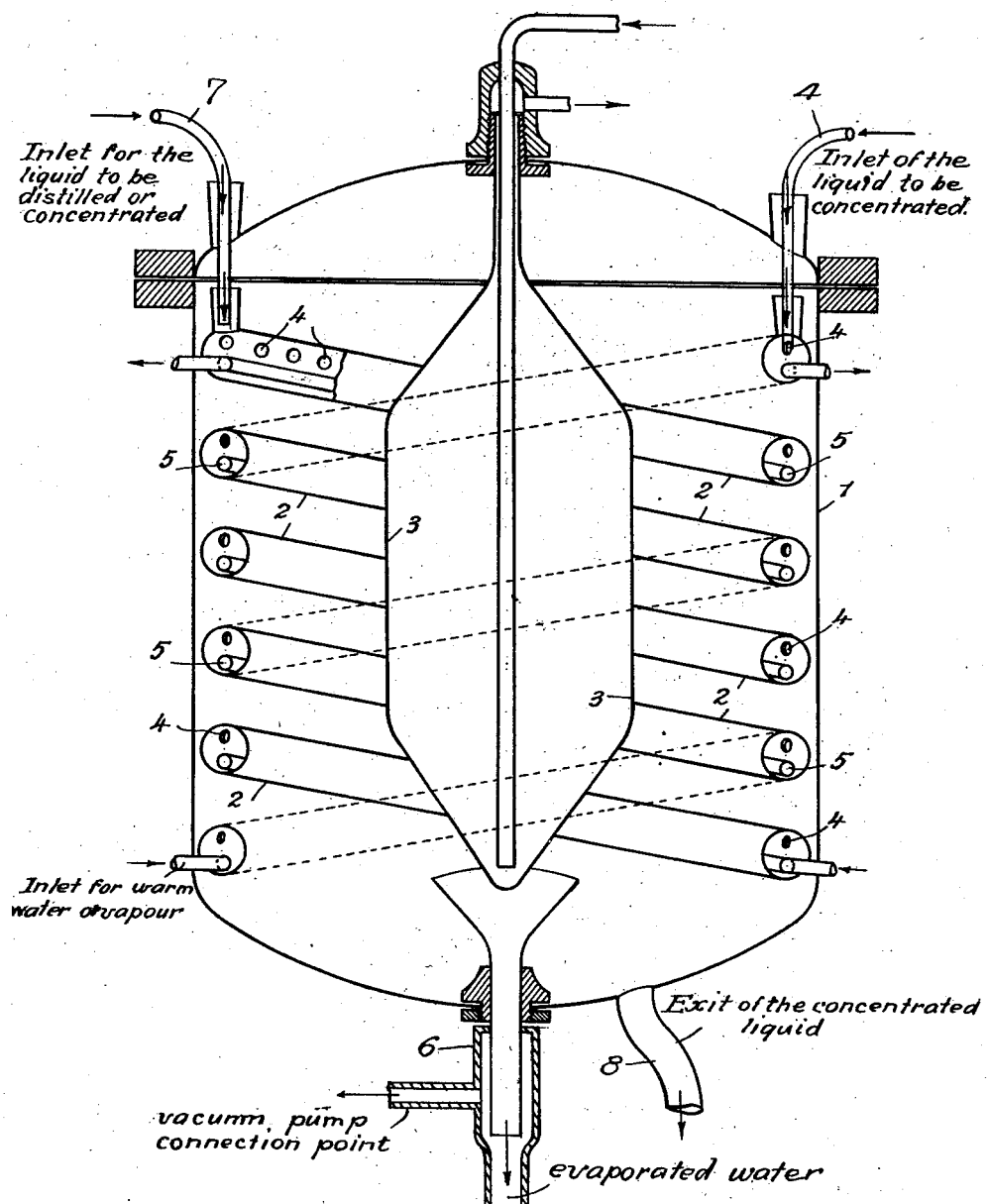

1,885,402

UNITED STATES PATENT OFFICE

OTTORINO ANGELUCCI, OF ROME, ITALY

APPARATUS FOR CONTINUOUS EVAPORATION OR DISTILLATION, ESPECIALLY WITH VACUUM

Application filed June 28, 1930, Serial No. 464,606, and in Germany July 8, 1929.

In order to concentrate liquids easily alterable by heat a process must be used by which a high evaporation speed at very low temperature may be obtained and it is necessary that the time of heating the liquid to be concentrated is very short.

Such a process may be carried out by means of the apparatus subject matter of my invention of which a preferred modification is shown by way of example in the annexed drawing.

It is known that the velocity of evaporation depends on the quantity of heat the liquid is capable of absorbing in a unit of time, and that the absorption of heat is the more rapid the greater the difference of temperature between the heating medium and the heated liquid, and the greater the velocity with which the vapors produced are eliminated.

It is also known that the boiling temperature of a liquid depends on the pressure to which the liquid is submitted, and therefore an apparatus for concentrating at a low pressure, liquids alterable by heat, must have means for supplying in a continuous way a great quantity of heat to the liquid which is concentrated, and a means for rapidly condensing the vapors formed and obtaining a very high vacuum.

The apparatus shown in the drawing comprises a cylindrical receptacle 1 closed by a cover in which both the evaporator 2 and condenser 3 are placed in close juxtaposition.
The receptacle is connected to a vacuum pump by means of lines connected to outlet tube 6 for condensed evaporated water.

The evaporator 2 comprises two spirally wound tubes provided in the part away from the condenser, with holes 4 through which the vapors of the liquid being concentrated pass without appreciable friction. In the interior of these tubes forming the evaporator, tubes 5 are provided in which a large quantity of heat carried by vapor or hot water flows in the direction of the arrows.

The liquid to be concentrated is admitted to the tubes of the evaporator by means of tubes 7 and passes through them in a controlled quantity so that after passing through the whole length of the tubes it shows the desired degree of concentration, and by means of tube 8, is discharged from the apparatus.

The liquid takes only a minute to flow along the tubes so that it is heated only during this little time.

In this apparatus from which the gases are extracted by means of a vacuum pump the vapors generated in the evaporator pass through holes 4 and are immediately condensed by the condenser 3. Therefore a very rapid evaporation is obtained at a pressure corresponding to the tension of vapor of liquid condensed on condenser (Watt's principle).

The condenser may be easily kept at a very low temperature by admitting cold water thereto. Very low pressures may therefore be obtained, and concentration temperatures even of 20° C. without appreciably decreasing the velocity of evaporation.

If the evaporator were distant from the condenser, the condensation of the vapors would not be immediate, because it is known that in an ambient of constant pressure the time the vapors need for passing from the one to the other is proportional to the square of the distance between them. Thus, also in case of the vapors having to overcome a certain friction while passing from the evaporator to the condenser, a delay in condensation would occur, i. e. there would be conditions similar to those existing in the known concentration apparatuses, and it would not be possible to obtain a rapid evaporation at temperatures inferior to 40° C.

When concentrating liquids in vacuo at temperatures inferior to 40° C. a very irregular and tumultuous boiling occurs, especially when the liquid to be concentrated forms a layer of some thickness.

For removing these drawbacks the evaporator of the apparatus according to application comprises two coils in which the liquid to be concentrated flows in a quantity proportional to the velocity of evaporation of each tube so that the evaporator can contain the small quantity of liquid flowing therein even if boiling be violent.

In passing through the evaporator the liquid is concentrated, and as a consequence the boiling temperature is raised. For obtaining the velocity of evaporation equal at all points of the evaporator, it is necessary that in relation to the rise of boiling point of liquid also the temperature of the heating medium should rise, and for this reason the heating is to be effected by counter-currents.

Both in concentrators with bundles of tubes acting at low temperature, or, which is the same, at low pressure, and in an evaporator such as used with my apparatus, the liquid to be concentrated does not come into direct contact with the heating tubes, but between the latter and the liquid a vapor jacket is formed which has a higher temperature than that of the liquid which is being concentrated.

In concentrators with tube bundles the vapor passes continuously along with the liquid into the expansion chamber in which it is cooled rapidly and acquires the same temperature of the liquid, while in my apparatus it does not expand at all and immediately passes to the condenser at the same temperature at which it is generated, thereby destroying the foam eventually being formed in the evaporator tubes.

My above described apparatus may also be used for distilling liquids of difficult disillation and as a heat recovering concentrator.

Having now particularly described and ascertained the nature of my said invention and in what manner the same is to be performed, I declare that what I claim is:

1. A device for evaporating and for distilling liquids in vacuo with simultaneous condensation of the vapor in the vacuum chamber comprising an air tight receptacle, an evaporator located in said air tight receptacle having the form of a perforated tube in which the liquid to be evaporated flows, heating tubes within said evaporator for heating said liquid, a condenser having the said evaporating system arranged in juxtaposition thereto, the surface of said condenser being considerably larger than the heating surface of the heating tubes so that a high vacuum may be obtained within said chamber.

2. A device for evaporating and for distilling liquids in vacuo with simultaneous condensation of the vapor in the vacuum chamber comprising an air tight receptacle, an evaporator in said receptacle having the form of a worm-shaped perforated tube in which the liquid to be evaporated flows, heating tubes within said evaporator for heating said liquid, a condenser having the said evaporating system arranged in juxtaposition thereto, the surface of said condenser being considerably larger than the heating surface of said heating tubes.

In testimony whereof I have hereunto signed my name.

OTTORINO ANGELUCCI.